United States Patent
Salmon et al.

(10) Patent No.: US 7,028,950 B2
(45) Date of Patent: Apr. 18, 2006

(54) LOAD BEARING WINDOW

(75) Inventors: James J. Salmon, Kirkland, WA (US); Scot McKee, Mill Creek, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/842,615

(22) Filed: May 10, 2004

(65) Prior Publication Data

US 2005/0247822 A1    Nov. 10, 2005

(51) Int. Cl.
B64C 1/14    (2006.01)

(52) U.S. Cl. .................................................. 244/129.3

(58) Field of Classification Search ............ 244/117 R, 244/119, 129.3, 129.4; 52/204, 591, 309.2, 52/208; 428/38, 81, 83, 138, 192
See application file for complete search history.

(56) References Cited

U.S. PATENT DOCUMENTS

| | | | |
|---|---|---|---|
| 2,300,506 A * | 11/1942 | Kamerer ................. 52/204.591 |
| 2,511,168 A * | 6/1950 | Martin et al. ................. 428/38 |
| 2,576,734 A * | 11/1951 | Voelker ..................... 52/309.2 |
| 2,650,890 A * | 9/1953 | Bledsoe ....................... 52/208 |
| 2,696,451 A * | 12/1954 | Snyder ......................... 428/83 |
| 3,061,490 A * | 10/1962 | Ryan ........................... 428/81 |
| 3,897,033 A | 7/1975 | Harding et al. |
| 4,004,388 A | 1/1977 | Stefanik |
| 4,081,581 A * | 3/1978 | Littell, Jr. .................... 428/138 |
| 4,284,677 A * | 8/1981 | Herliczek .................... 428/192 |
| 4,964,594 A | 10/1990 | Webb |
| 5,039,566 A | 8/1991 | Skubic et al. |
| 5,128,678 A | 7/1992 | Novak et al. |
| 5,622,115 A | 4/1997 | Ehrlich et al. |
| 5,665,450 A | 9/1997 | Day et al. |
| 5,700,894 A | 12/1997 | Krieg et al. |
| 6,082,674 A | 7/2000 | White et al. |
| 6,715,245 B1 * | 4/2004 | Lewkowitz .................. 52/208 |
| 2003/0082341 A1 | 5/2003 | Chu |
| 2004/0062934 A1 | 4/2004 | Miller et al. |

FOREIGN PATENT DOCUMENTS

JP    10-36139    2/1998

(Continued)

OTHER PUBLICATIONS

Hongy Lin, Seung-Gu Kang, Delbert E. Day, James O. Stoffer, "The Effect of Fiber Annealing on the Properties of An Optically Transparent Pmma Composite" Composites Science and Technology, 1994, 4 pages.

(Continued)

Primary Examiner—Galen Barefoot
(74) Attorney, Agent, or Firm—Harness Dickey & Pierce P.L.C.

(57) ABSTRACT

A substantially strong, lightweight load bearing window for use in a mobile platform, for example, an aircraft. The window includes a rim portion having a carbon reinforced resin structure and a transparent portion having a fiberglass reinforced resin structure. A plurality of holes are formed in the rim portion for enabling a plurality of connectors to be inserted therethrough. The rim portion has a smaller cross sectional area (i.e., thickness) than the transparent portion such that the rim portion is adapted to fit behind a skin of an aircraft, the transparent portion is adapted to be flush with the skin of the aircraft. The connectors fix the window to the skin of the aircraft. The window effectively forms a strong, structurally integral portion of the skin.

10 Claims, 3 Drawing Sheets

FOREIGN PATENT DOCUMENTS

| | | |
|---|---|---|
| WO | WO96/30203 | 10/1996 |
| WO | WO 00/20275 | 4/2000 |

OTHER PUBLICATIONS

Kevin D. Weaver and James O. Stoffer, "Interfacial Bonding and Optical Transmission for Transparent Fiberglass/Poly(Methyl Methacrylate) Composites" Polymer Composites, Apr., 1995, pp. 161-169.

H. Lin, D.E. Day, K.D. Weaver, J.O. Stoffer, "Temperature and wavelength dependent transmission of optically transparent glass fibre poly (methyl methacrylate) composites", Journal of Materials Science, 1994, pp. 5193-5198.

Hongy Lin, Delbert E. Day, James O. Stoffer, Aging Behavior of Optically Transparent Poly(Methyl Methacrylate) Composites, Polymer Composites, Oct., 1993, pp. 402-409.

Kevin D. Weaver, James O. Stoffer, Delbert E. Day, "Preparation and Properties of Optically Transparent Pressure-Cured Poly (Methyl Methacrylate Composites", Polymer Composites, Dec., 1993, pp. 515-523.

Hongy Lin, Delbert E. Day, James O. Stoffer, Model for the temperature dependent transmission of optically transparent poly(methyl methacrylate) composites.

James R. Olson, Delbert E. Day, James O. Stoffer, "Fabrication and Mechanical Properties of an Optically Transparent Glass Fiber/Polymer Matrix Composite", Journal of Composite Materials, vol. 26, No. 8, 1992, pp. 1181-1192.

Hongy Lin, Delbert E. Day, James O. Stoffer, "Optical and Mechanical Properties of Optically Transparent Poly(methyl) Composities", Polymer Engineering and Science, vol. 32, No. 5, Mid-Mar., 1992, pp. 344-350.

H451 - United States Statutory Invention Registration - Pinnell - published Apr. 5, 1988 for "Frameless Transparencies For Aircraft Cockpit Enclosure".

* cited by examiner

LOAD BEARING WINDOW

FIELD OF THE INVENTION

The present invention relates to aircraft windows, and more particularly to a load bearing window assembly for an aircraft.

BACKGROUND OF THE INVENTION

Passenger windows in most commercial aircraft are relatively small in size. This is due, in part, to the limited capabilities of current transparent window materials and also due to the heavy and complex support structure needed to support these windows within the frame of the aircraft.

Typically, these transparent window materials consist of a transparent polymer. While very successful in the industry and exhibiting such useful qualities as high durability and easy formation of complex shapes, these polymer windows do have a limited strength capability. Moreover, these windows require a heavy support structure in order to support the window within the structural skin of the aircraft. This support structure generally includes window forgings and stringers. Each component is designed to strengthen the skin panel which surrounds and supports the window. However, each component added, in turn, increases the cost and weight of the completed window assembly, thereby providing an incentive to keep passenger windows relatively small.

However, with the improved manufacturability of fiber reinforced plastic materials, such materials can be used more easily in constructing transparent windows that are even lighter and stronger than previously produced aircraft window assemblies. Accordingly, it would still be desirable to provide a load bearing window having fewer parts, less weight, and increased load carrying capability using transparent fiber reinforced plastic materials compared with traditional aircraft windows.

SUMMARY OF THE INVENTION

A load bearing window for use in an aircraft includes a rim portion having a carbon reinforced resin structure and a transparent portion having a fiberglass reinforced resin structure. A plurality of connectors are located in the rim portion. The rim portion has a smaller cross sectional area than the transparent portion such that the rim portion is adapted to fit behind a skin of an aircraft, the transparent portion is adapted to be flush with the skin of the aircraft, and the connectors are adapted to be fixed to the skin of the aircraft.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
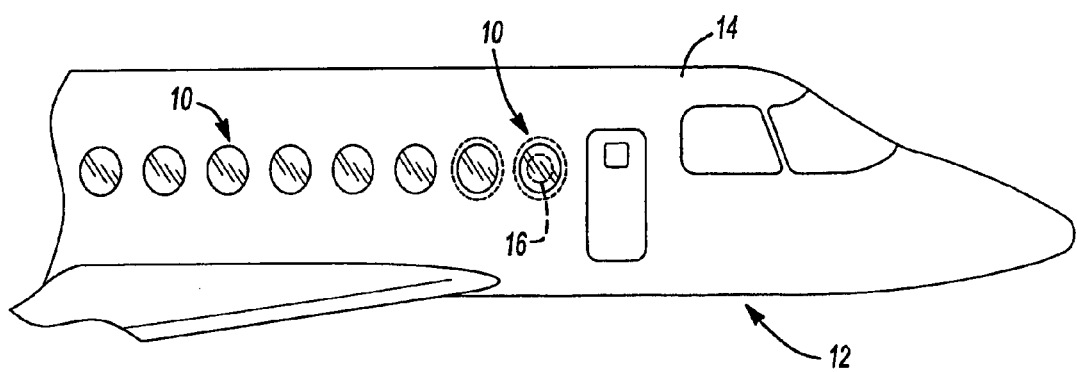
FIG. 1 is a partial side view of a front of an aircraft having a load bearing window constructed according to the principles of the present invention

Referring to FIG. 1, there is illustrated a preferred embodiment of a load bearing window 10 constructed according to the principles of the present invention shown mounted to a mobile platform, in this instance, an exemplary aircraft 12. While in the particular example provided, the load bearing window 10 is shown as a side window of the aircraft 12. It should be appreciated, however, that the load bearing window 10 may be used in any portion of the aircraft 12 and may include the cockpit window or a door window. The aircraft 12 generally includes an airframe skin 14 that surrounds the load bearing window 10. A traditional prior art side window is shown in FIG. 1 in phantom lines and is generally indicated by reference numeral 16. As is apparent, the load bearing window 10 has a larger field of view than the traditional prior art side window 16.

Figure 2:
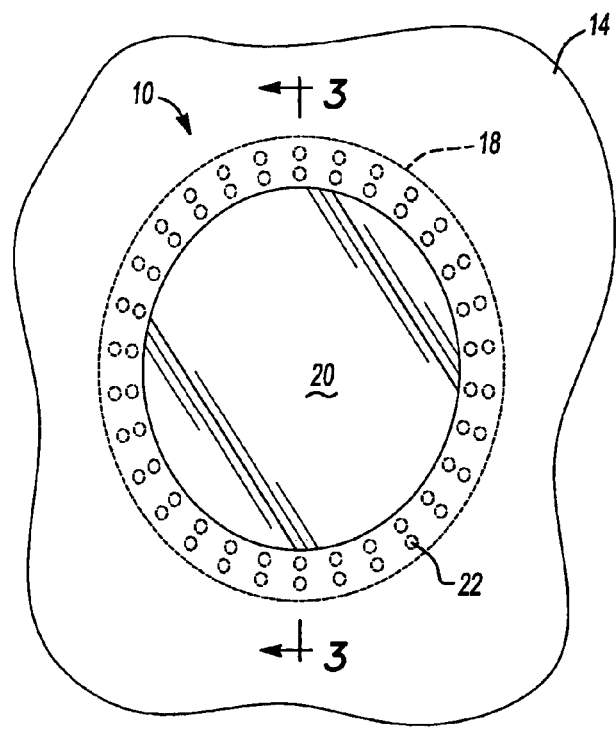
FIG. 2 is a front view of the load bearing window of the present invention.
Figure 3:
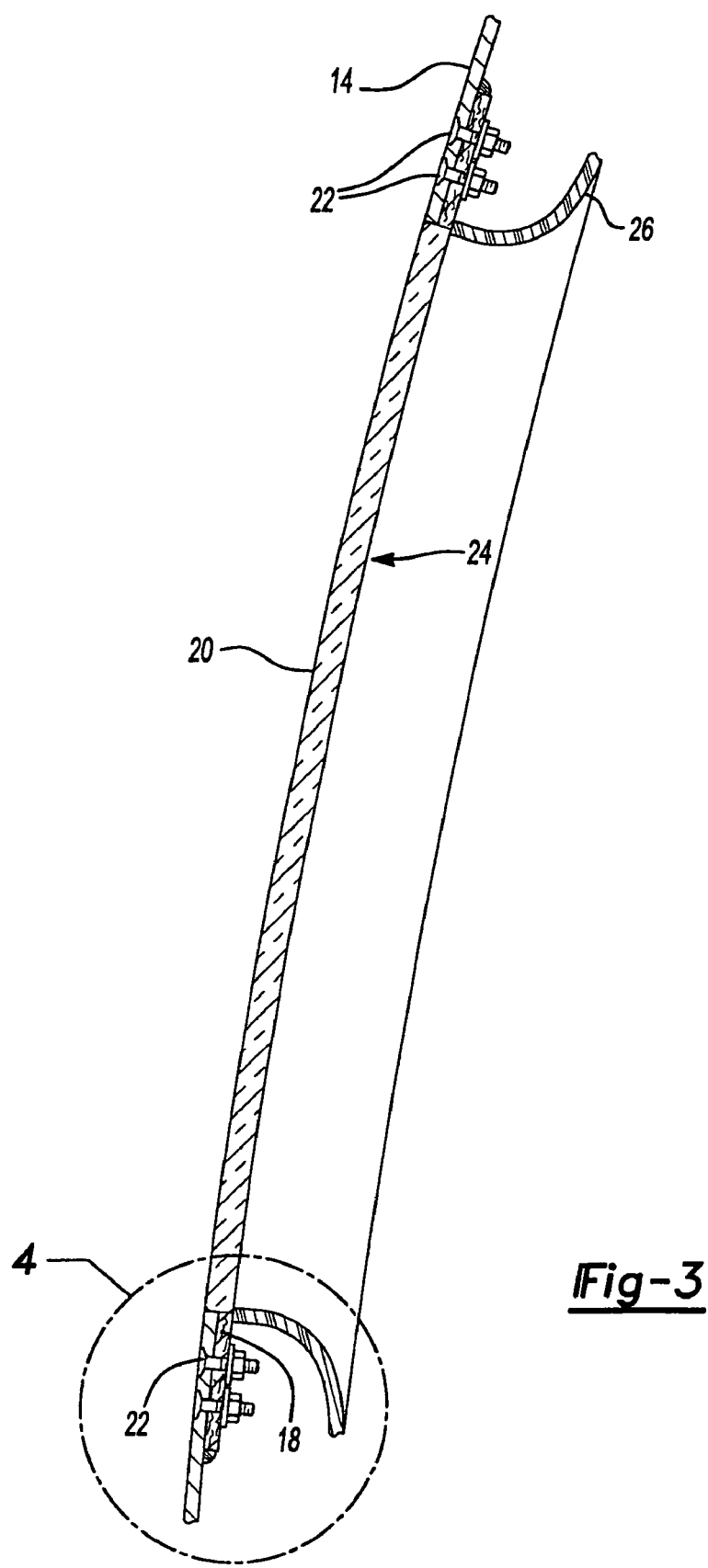
FIG. 3 is a side cross-sectional view of the load bearing window of the present invention and the aircraft taken in the direction of arrow 3—3 in FIG. 1.
Figure 4:
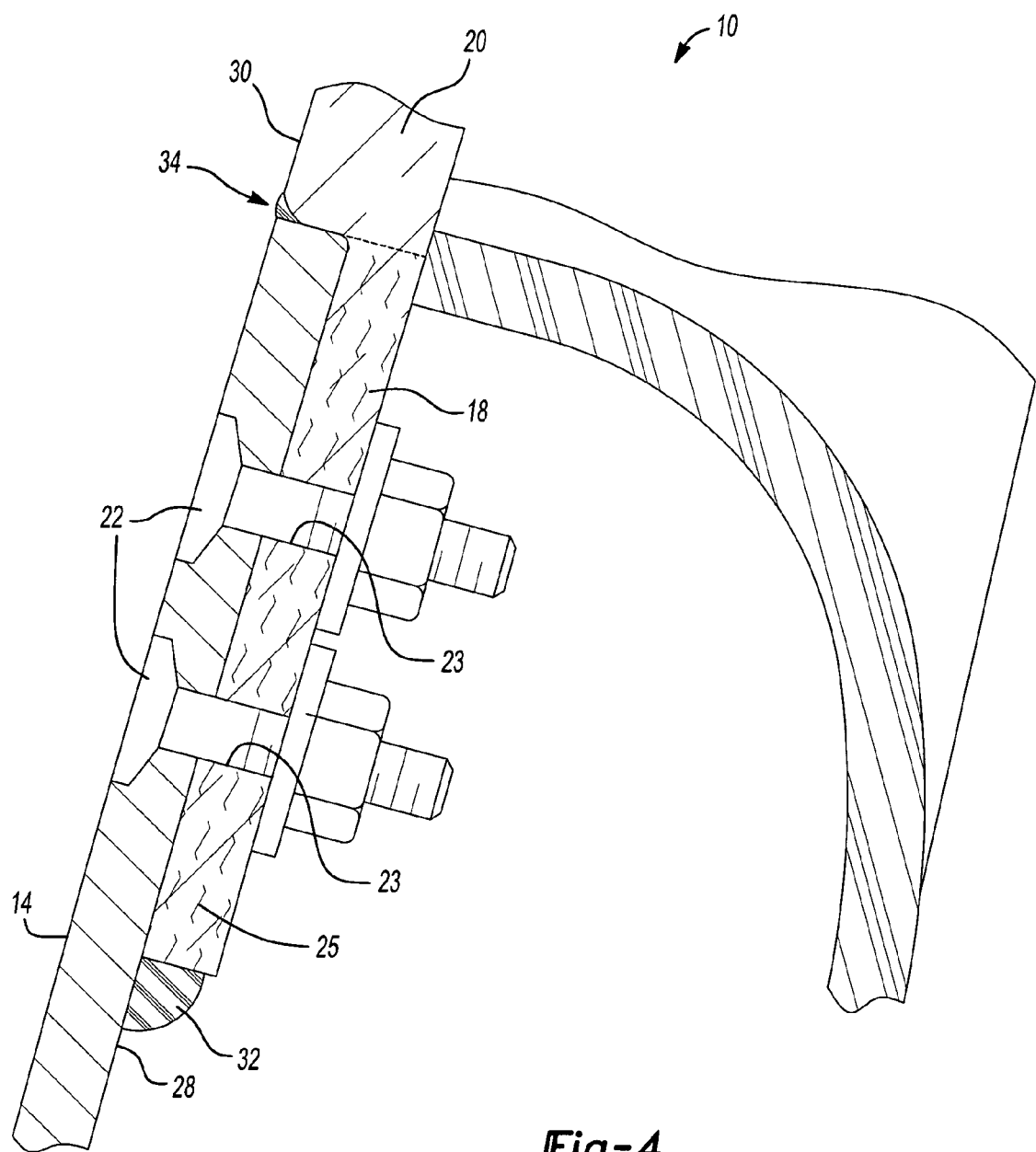
FIG. 4 is an exploded view of the area indicated by arrow 4—4 in FIG. 3 showing the connection between the load bearing window of the present invention and the aircraft fuselage structure.

Turning now to FIGS. 2–4, the load bearing window 10 generally includes a rim portion 18 and a transparency portion 20. The rim portion 18 and the transparency portion 20 are formed integrally from a reinforced resin. The method of making the rim portion 18 and the transparency portion 20 is disclosed in commonly assigned U.S. Pat. No. 6,889,938 issued on May 10, 2005, hereby incorporated by reference in its entirety as if fully set forth herein. The rim portion 18 is reinforced with carbon 25 (FIG. 4) and is not transparent. Alternatively, the rim portion 18 may be reinforced with aluminum or titanium graphite. It should be appreciated, however, that various other suitable forms of reinforcement may be employed. The transparency portion 20 is reinforced with fiberglass and the fiberglass and resin used therein have the same index of refraction. A plurality of holes 23 are formed within the rim portion 18 surrounding the transparency portion 20 for accepting a corresponding plurality of connectors 22. The connectors 22 may comprise threaded fastening elements, rivets or any other suitable type of fasteners. While in the particular example provided, the load bearing window 10 is illustrated as having an oval shape, it is to be appreciated that various other window shapes may be employed, such as, for example, circular shaped and rectangular shaped windows.

With reference to FIG. 3, the load bearing window 10 is shown mounted to the airframe skin 14. The airframe skin 14 is preferably an aluminum or carbon skin, although the load bearing window 10 may also be mounted to a honeycombed skin. The load bearing window 10 effectively acts as a structurally reinforcing "patch" applied over a hole 24 formed in the airframe skin 14. Accordingly, the assembled load bearing window 10 and airframe skin 14 behave similarly to a structural repair and can be analyzed for load capacity using structural repair analysis methods. The hole 24 formed in the airframe skin 14 replaces the traditional window structure 16 (FIG. 1). Accordingly, the interior wall structure of the aircraft 12 in the immediate area of the load bearing window 10, which is generally indicated by reference numeral 26, is resized around the hole 24 as shown in FIG. 3.

Turning now to FIG. 4, the rim portion 18 of the load bearing window 10 is coupled to an inner surface 28 of the airframe skin 14 by the connectors 22. As can be seen in FIG. 4, the rim portion 18 forms a peripheral step portion with the transparency portion 20 having a greater cross-sectional area than the rim portion 18. This allows the rim portion 18 to fit flush with the inner surface 28 of the airframe skin 14 while allowing the transparency portion 20 to align flush with an outer surface 30 of the airframe skin 14. A primary pressure seal 32 seals the inner surface 28 of the airframe skin 14 to the rim portion 18 of the load bearing window 10. A secondary pressure seal 34 seals the outer surface 30 of the airframe skin 14 to the load bearing window 10 to prevent rain from entering therein.

Preferably, the connectors 22 are formed in a double row, as best seen in FIGS. 2 and 4, and comprise bolts or other suitably strong fastening elements. It should be appreciated, however, that any number of rows of holes 23 may be employed and various other forms of securing may be used, such as, for example, adhesive bonding. The holes 23 are illustrated as being arranged in two parallel rows, but other configurations could just as easily be implemented.

Once installed, the load bearing window 10 carries loads from the airframe skin 14 (e.g., pressure or impact loads) through the rim portion 18 and partially through the transparency portion 20 through the reinforcing fibers located therein. By modularly installing the load bearing window 10 into a conventional airframe skin 14, the heavy casting and forging reinforcement assemblies of conventional window assemblies may be removed without sacrificing strength. Moreover, little or no additional modifications must be made to the airframe skin 14 itself or the method by which the fuselage is constructed, to install the load bearing window 10.

It will also be appreciated that while the load bearing window 10 is shown as incorporated in an aircraft that it could just as readily be implemented on other types of mobile platforms, such as buses, ships, trains, motor craft and any other airborne vehicle requiring at least one window.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A composite, load bearing window for use in a mobile platform comprising:
   a composite rim portion having a first reinforced resin structure;
   a composite, transparent window portion having a second reinforcing structure, the rim portion being integrally formed with the transparent window portion;
   a plurality of openings located in said rim portion for accepting a plurality of connectors; and
   wherein said rim portion has a smaller cross sectional area than said transparent window portion such that said rim portion is adapted to fit adjacent a flange free opening in a skin of the mobile platform, said transparent window portion being adapted to be generally flush with the skin of the mobile platform, and wherein said connectors are adapted to be fixed to the skin of the aircraft.

2. The load bearing window of claim 1, wherein said plurality of connectors extend around said rim portion in a double row.

3. The load bearing window of claim 1, wherein said load bearing window is adapted to be used as a modular patch in an aircraft to replace an existing aircraft window.

4. The load bearing window of claim 1, wherein said rim portion comprises carbon as said reinforcing structure.

5. The load bearing window of claim 1, wherein said transparent portion comprises fiberglass and resin, said fiberglass and said resin having approximately equal indices of refraction.

6. An aircraft having a composite load, bearing window comprising:
   an airframe skin having an inner, an outer surface and a flange free opening;
   a composite, load bearing window mounted within said airframe skin, said load bearing window comprising:
      an integrally formed, composite peripheral rim portion having a reinforced resin structure that is not transparent;
      a composite, transparent window portion having a reinforced resin structure integrally formed with the rim portion; and
      a plurality of holes located in said rim portion for receiving a plurality of connectors;
   wherein said plurality of connectors are secured to said airframe skin such that said rim portion fits to said inner surface adjacent said flange free opening, and said transparent window portion is approximately flush with said outer surface;
   wherein said connectors secure said composite load bearing window to said airframe skin and loads are transferred through said airframe skin, through said rim portion and into said composite, transparent window portion;
   wherein said rim portion rests against said inner surface of said airframe skin;
   a first seal mounted between said outer surface of said airframe skin and said composite transparent window portion of said composite load bearing window; and
   a secondary seal mounted between said inner surface of said airframe skin and said rim portion of said composite load bearing window.

7. The composite load bearing window of claim 6, wherein said plurality of connectors extend around said rim portion in a double row.

8. The composite load bearing window of claim 6, wherein said composite load bearing window is adapted to be used as a modular patch in the aircraft to replace an existing aircraft window.

9. The composite load bearing window of claim 6, wherein said rim portion comprises carbon as a reinforcing component.

10. The composite load bearing window of claim 6, wherein said transparent portion is reinforced with fiberglass, and said fiberglass and said resin have approximately equal indices of refraction.

* * * * *